United States Patent [19]

Nishida et al.

[11] 4,423,447

[45] Dec. 27, 1983

[54] HEAD POSITIONING MECHANISM FOR MAGNETIC DISC MEMORY DEVICE

[75] Inventors: Hiroshi Nishida, Kanagawa; Tuyoshi Takahashi; Toshio Shiono, both of Odawara; Kiyomitsu Ohtsuka, Atami, all of Japan

[73] Assignee: Hitachi, Ltd., Tokyo, Japan

[21] Appl. No.: 247,053

[22] Filed: Mar. 24, 1981

[30] Foreign Application Priority Data

Mar. 24, 1980 [JP] Japan .............................. 55-36108

[51] Int. Cl.³ .......................... G11B 5/48; G11B 5/54
[52] U.S. Cl. .................................. 360/106; 360/109
[58] Field of Search .................... 360/106, 109, 97–99, 360/105

[56] References Cited

U.S. PATENT DOCUMENTS

| | | | |
|---|---|---|---|
| 3,859,662 | 1/1975 | Habich | 360/106 |
| 3,881,189 | 4/1975 | Mayeda | 360/106 |
| 4,161,004 | 7/1979 | Dalziel | 360/109 |
| 4,163,996 | 8/1979 | Kaseta et al. | 360/106 |

OTHER PUBLICATIONS

IBM TDB, E. L. Bailey, Idler System for Transducer Supporting Band, vol. 17, No. 11, Apr. 1975, pp. 3426–3427.
IBM TDB, D. S. Proper, Accurately Positioning Transducers to Rotating Disks, vol. 18, No. 7, Dec. 1975, p. 2066.
IBM TDB, D. S. Proper, in situ Sero Track Recording for a Record Storage Disk, vol. 20, No. 7, Dec. 1977, pp. 2074–2075.
IBM TDB, T. R. Fournier, Dual-Band Access Mechanism, vol. 19, No. 7, Dec. 1976, pp. 2675–2677.

*Primary Examiner*—Alfred H. Eddleman
*Attorney, Agent, or Firm*—Antonelli, Terry & Wands

[57] ABSTRACT

A magnetic head positioning mechanism positions a magnetic head carried on a carriage at a specific location on a magnetic disc through the movement of a belt mounted to a motor spindle of a step motor. The magnetic head positioning mechanism pulls one end of a belt of which the other end is wound or unwound around a motor pulley, thereby to constantly apply a rotation torque and thereby to eliminate an adverse effect by a dead zone due to the hysteresis phenomenon of the step motor. Alternatively, the rotation torque is always applied to the step motor by pulling the carriage in an access direction, thereby to improve the positioning accuracy of the head.

5 Claims, 6 Drawing Figures

HEAD POSITIONING MECHANISM FOR MAGNETIC DISC MEMORY DEVICE

BACKGROUND OF THE INVENTION

The present invention relates to a head positioning mechanism for a magnetic disc memory device.

A magnetic disc memory device contains a head positioning mechanism for positioning a magnetic head at a track on a magnetic disc to and from which magnetic data is recorded and reproduced. The prior head positioning mechanism is comprised of a carriage carrying a magnetic head, a guide rail for rectilinearly guiding the carriage, a belt partially fixed to the carriage, and a step motor for rectilinearly moving the carriage along the guide rail upon the drive of the belt. An example of the head positioning mechanism is disclosed in U.S. Pat. No. 3,946,439, in which a belt is wound around a motor pulley of a step motor and another pulley, and a magnetic head is mounted on the carriage.

The positioning mechanism of the type using the step motor encounters a hysteresis phenomenon in forward and reverse drives of the motor rotation, resulting in deterioration of the accuracy of the positioning. FIG. 1 shows a characteristic curve representing a relationship between a holding torque and a rotation angle in a one-step rotation of the step motor. In the figure, an arrow 1a directing from point A to point Ao represents a relationship between torque and angle when the motor is rotated forwardly to make the positioning of the head. An arrow 1b directing from point B to point Bo represents a relationship between torque and angle when the motor is reversely rotated to make the positioning. When the positioning is performed through the forward rotation of the motor as indicated by the arrow 1a and the holding torque is zero, the positioning is made at an angle as indicated by point Ao. Conversely, when the positioning is performed through the reverse rotation of the motor as indicated by the arrow 1b, the positioning is made at an angle as indicated by point Bo.

As described above, the positioning mechanism by the step motor has a dead zone C in the forward and reverse rotations. The dead zone is a serious problem in the positioning mechanism requiring a high positioning accuracy.

Thus, particularly, the conventional positioning mechanism using the step motor as a drive source of the magnetic disc, which requires a high accuracy positioning between the magnetic disc and the magnetic head, can not have an accuracy of more than 50 TPI (track per inch). Therefore, the positioning mechanism can not meet the requirement of high density of recording tracks for the magnetic disc.

In the conventional positioning mechanism by the step motor in a magnetic disc device, excessive external force is never applied to the step motor. It is for this reason that, even when the recording medium (disc) is replaced by another medium, it is required that the magnetic head is positioned at a given absolute position for keeping a relative position of the track to the magnetic head. Accordingly, the prior positioning mechanism normally makes the positioning in the dead zone C shown in FIG. 1. For this reason, the accuracy of the positioning depends on the dead zone, resulting in poor positioning accuracy.

SUMMARY OF THE INVENTION

Accordingly, an object of the present invention is to provide a magnetic head positioning mechanism which can prevent a positioning error arising from a hysteresis phenomenon of a step motor.

A magnetic head positioning mechanism for a magnetic disc memory according to the present invention is comprised of: a carriage carrying a magnetic head for making record/playback of magnetic data; a guide shaft for rectilinearly guiding the carriage; a step motor for driving a belt partially fixed to the carriage; and a pulling means for always applying rotation torque to the step motor; wherein the positioning is made off a dead zone caused by the hysteresis phenomenon of the step motor by applying rotation torque from the pulling means to the step motor. The positioning mechanism with such a construction can prevent positioning error in the forward and reverse drives of the step motor rotation, therefore to secure high accuracy positioning.

DETAILED DESCRIPTION OF THE PREFERRED EMBODIMENTS

Figure 1:
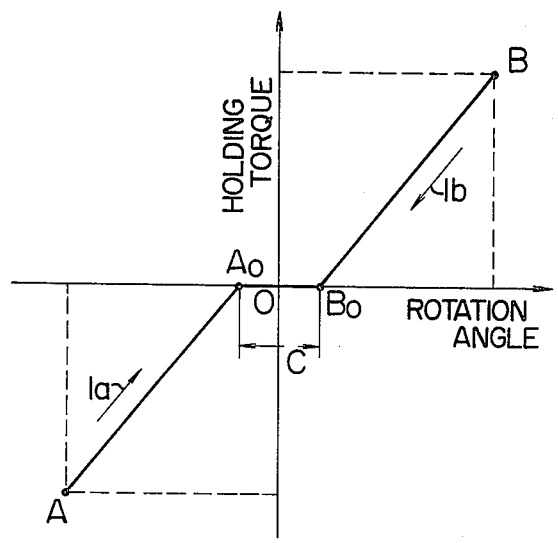
FIG. 1 graphically represents a relationship of holding torque versus rotation angle at the time of one step rotation of a step motor in a prior magnetic head positioning mechanism.
Figure 2:
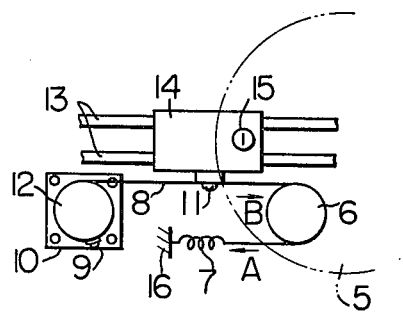
FIG. 2 is a schematic diagram of an embodiment of a magnetic head positioning mechanism according to the present invention.

A principle of a magnetic head positioning mechanism according to the present invention will be described referring to FIG. 2. In FIG. 2, a magnetic head 15 is mounted on a carriage 14 which is rectilinearly movable along a couple of guide rails 13. A steel belt 8 is fixed at one end to a motor pulley 12 of a step motor 10 by means of a screw 9, is wound around a rotatable pulley 6 and is pulled at the other end by a spring 7. The steel belt 8 is partially fixed to the carriage 14 by means of a screw 11. Accordingly, the step motor is always under exertion of rotation torque by the spring 7.

When the motor is driven, the carriage 14 screwed to the steel belt 8 moves along the pair of the guide rails 13, through a process of winding or unwinding the steel belt 8 by the motor pulley 12.

Figure 4:
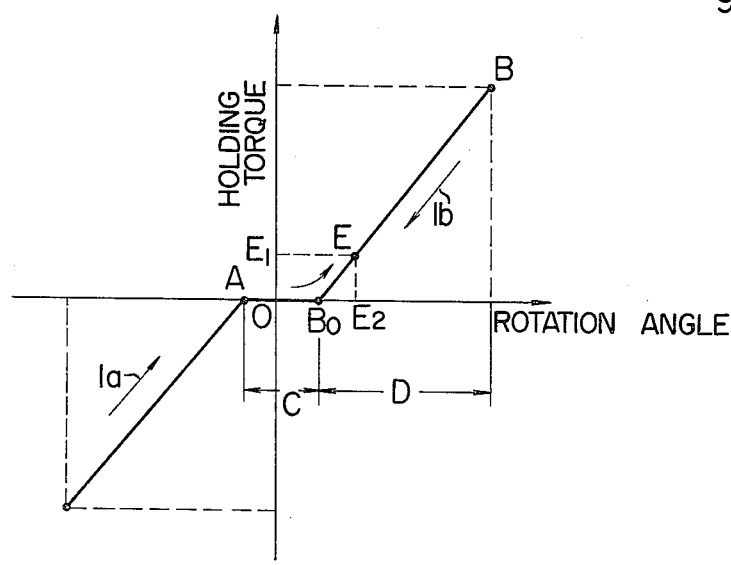
FIG 4 is a relationship between holding torque and rotation angle at the time of one step rotation of a step motor in a magnetic head positioning mechanism according to the present invention.

Therefore, the positioning of the magnetic head positioning mechanism according to the present invention is performed within a zone D in a torque characteristic curve of holding torque versus rotation angle shown in FIG. 4. As shown, the zone D is off the dead zone, with the result that a high accuracy positioning is secured by the positioning mechanism.

When the zone D is used as the positioning zone, since a torque varies depending on the position of the head, a relative angle position of the step motor fluctuates depending on the head position. In a fixed type magnetic disc memory device (of the type in which the magnetic disc is tightly closed and its replacement is impossible) which is developed as a result of a recent tendency of high density of memory capacity, a matter to be considered is only the reproducibility of the required positioning performance between the track and the head. Therefore, it is possible to use the zone D.

A magnetic disc memory device containing the magnetic head positioning mechanism using the principle of the present invention as mentioned above, will be described referring to FIGS. 5 and 6.

The magnetic disc memory device is comprised of a magnetic disc 5 rotated by a spindle motor 500, a filter 300 for cleaning inner air, and a shroud 200 for tightly closing a magnetic head positioning mechanism and the just-mentioned components. The shroud 200 together with an electronic circuit section 400 to control respective electronic circuits is covered with an external housing 100.

The magnetic head positioning mechanism comprises a carriage 14 carrying a magnetic head 15, a pair of guide rails 13 for rectilinearly guiding the carriage 14, a fixing member 130 for fixing the pair of guide rails 13 to a shroud base 210 and the motor 500 by means of screws, a steel belt 8 a part of which is screwed to the carriage 14, a motor pulley 12 to which one end of the steel belt 8 is fixed by a screw 9, a step motor 10 for rotating the motor pulley 12, a spring 7 which hooks the other end of the steel belt 8 to pull the belt 8 in a direction of an arrow A, a pin 16 which is fixed to the shroud base 210 and coupled with the spring 7, and a rotatable pulley 6 around which the steel belt 8 is wound.

Figure 5:
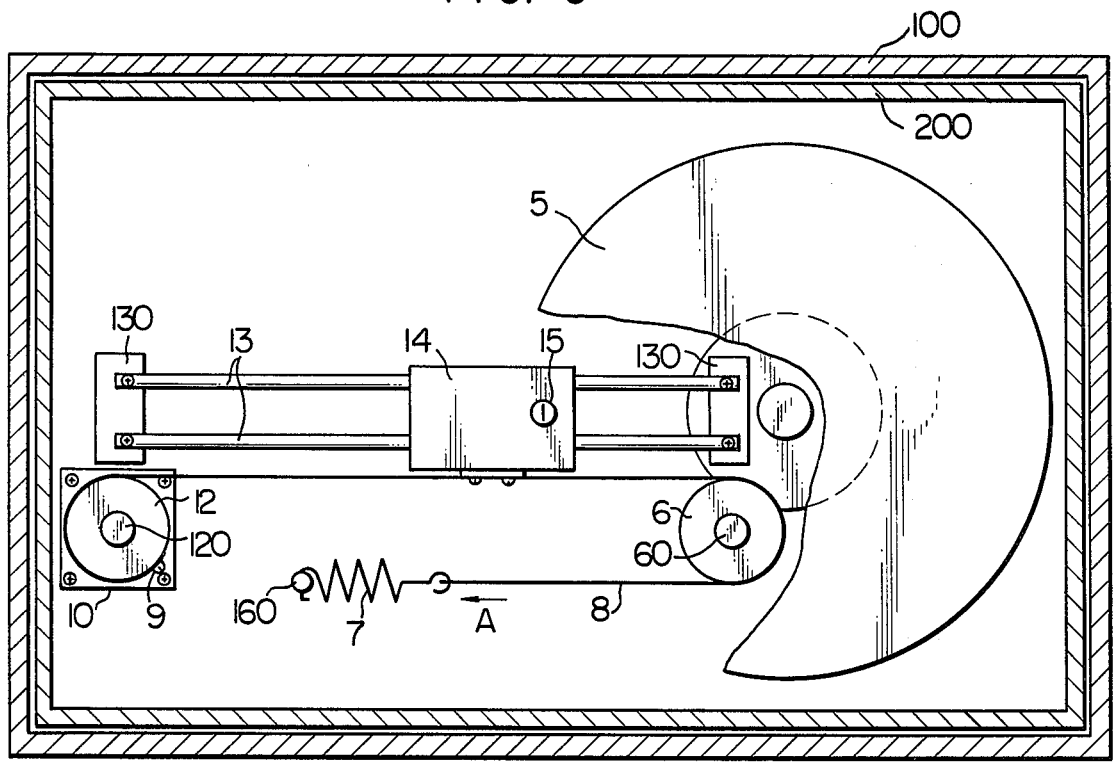
FIG. 5 is a plan view of a magnetic disc memory device including a magnetic head positioning mechanism to which the principle of the present invention illustrated in FIG. 2 is applied.
Figure 6:
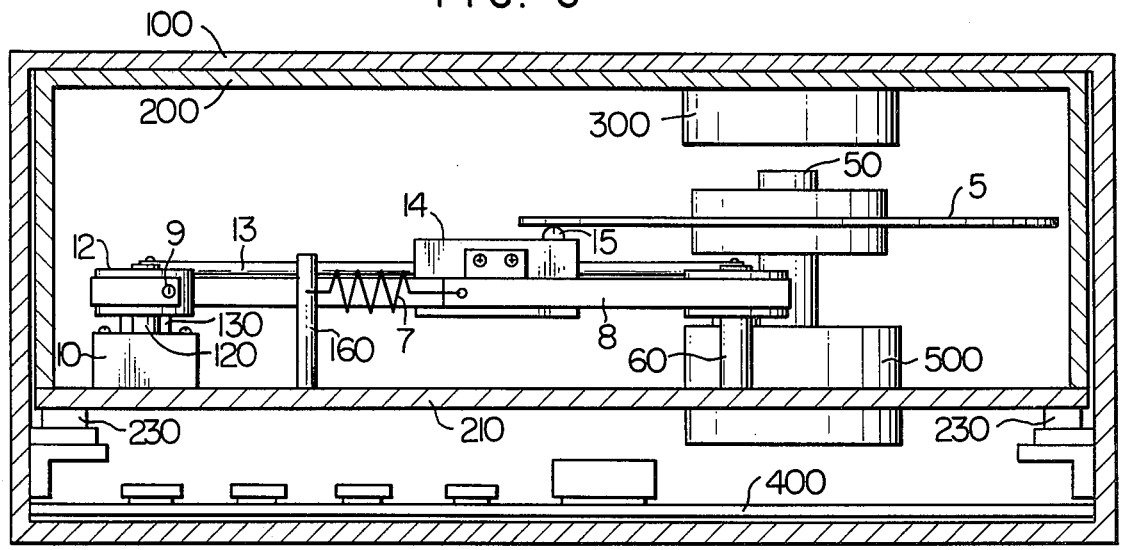
FIG. 6 is a longitudinal cross sectional view of a magnetic disc shown in FIG. 5.

In the magnetic head positioning mechanism, when the step motor 10 is rotated counterclockwise, the motor pulley 12 takes up the steel belt 8 to move the carriage 14 to the left direction in FIGS. 5 and 6 and to position the magnetic head 15 at a desired track. On the other hand, when the motor 10 is rotated clockwise, the motor pulley 12 is unwound to allow the spring 7 to pull the steel belt 8. At this time, the steel belt 8 moves the carriage 14 to the right direction in FIGS. 5 and 6 to make the positioning of the magnetic head 15.

As described above, the step motor 10 of the magnetic head positioning mechanism is always under exertion of a clockwise rotation torque, by pulling force of the spring 7 through the steel belt 8. Therefore, even if the holding torque (a torque produced by the motor per se due to an electrical torque) of the step motor is zero, the step motor is at a standstill at a point E defined by a holding torque $E_1$ and an angle $E_2$, as shown in FIG. 4, because of the exertion of the rotation torque by the spring 7. Thus, the motor rests at the point E, with the result that it is possible to make the positioning of the head at high accuracy in both the forward and reverse rotations.

Another embodiment of a magnetic head positioning mechanism according to the present invention will be described referring to FIG. 3. As shown, the positioning mechanism of this embodiment is comprised of a steel belt 8 wound around a motor pulley 12 and a pulley 6 and screwed to the pulley 12 by a screw 9, a carriage 14 carrying a magnetic head 15 and fixed to the steel belt 8 by a screw 11, a pair of guide rails 13 for guiding rectilinearly the carriage 14, and a spring 7 for pulling the carriage 14 in a direction of an arrow B. Also in this embodiment, the step motor 10 is always under exertion of a clockwise rotation torque by the pulling force of the spring 7, through the carriage 14 and the steel belt 8.

In operation, when the step motor 10 rotates, the steel belt 8 fixed at a part to the motor 10 moves to position the magnetic head 15 carried on the carriage 14.

Figure 3:
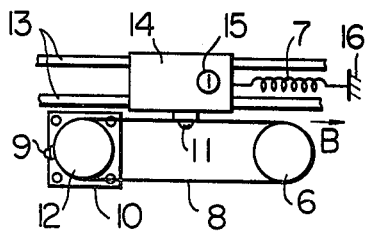
FIG. 3 is a schematic diagram of another embodiment of a magnetic head positioning mechanism according to the present invention.

As in the embodiment shown in FIGS. 5 and 6, the pulley 6 may be rotatably fixed to the shroud base or it may be pulled to the right direction in FIG. 3 by the spring in order to always apply a tension to the steel belt 8.

As described above, since the magnetic head positioning mechanism is provided with the means for constantly applying the rotation force to the step motor, the positioning error arising from the hysteresis phenomenon of the step motor can be extremely reduced.

What is claimed is:

1. A magnetic head positioning mechanism for positioning a magnetic head carried on a carriage at a track on a magnetic disc installed on a base, comprising:
   a carriage for carrying said magnetic head;
   guide rail means for supporting said carriage such that it is rectilinearly movable along said guide rail means;
   a belt partially mounted to said carriage;
   a motor pulley for winding or unwinding a first end portion of said belt;
   a step motor coupled with said motor pulley to drive said motor pulley in forward and reverse directions of rotation;
   a pin fixed to said base in a direction of extension of a second end portion of said belt; and
   pulling means connecting the second end portion of said belt with said pin for applying a rotational torque with a fixed direction to said motor under all conditions in a manner so as to avoid occurrence of an inherent step motor magnetic hysteresis phenomenon, by pulling said first end of said belt in a direction opposite to a winding direction of said motor pulley.

2. A magnetic head positioning mechanism for positioning a magnetic head carried on a carriage at a track on a magnetic disc installed on a base, comprising:
   guide rail means for supporting said carriage such that it is rectilinearly movable along said guide rail means;
   an endless belt partially mounted to said carriage;
   a motor pulley to which a part of said endless belt is fixed and around which said belt is wound;
   a pulley which hooks said endless belt fixed to said motor pulley in tension;
   a step motor for driving said motor pulley in forward and reverse directions of rotation;
   a pin fixed to said base, said pin and motor being disposed in opposite directions relative to said carriage; and
   pulling means connecting said carriage with said pin for applying a rotational torque with a fixed direction to said motor under all conditions in a manner so as to avoid occurrence of an inherent step motor magnetic hysteresis phenomenon, by pulling said carriage in a direction away from said motor pulley.

3. A magnetic head positioning mechanism for positioning a magnetic head carried on a carriage at a track on a magnetic disc installed on a base, comprising:

a carriage for carrying said magnetic head;

guide rail means for supporting said carriage such that it is rectilinearly movable along said guide rail means;

a belt partially mounted to said carriage;

a motor pulley for winding or unwinding a first end portion of said belt;

a step motor coupled with said motor pulley to drive said motor pulley in forward and reverse directions of rotation;

a pin fixed to said base in a direction of extension of a second end portion of said belt;

pulling means connecting said carriage with said pin through said belt for applying a rotational torque with a fixed direction to said motor under all conditions in a manner so as to avoid occurrence of an inherent step motor magnetic hysteresis phenomenon, by pulling said second end portion of the belt in a direction opposite to a winding direction of said motor pulley; and a rotatable pulley which contacts with a section of said belt between the portion of said belt mounted to said carriage and the portion coupled with said pulling means.

4. A magnetic head positioning mechanism according to claim 1 or 3, wherein said pulling means contains a spring which is fixed at one end and coupled at the second end with the other end portion of said belt, and pulls said second end portion of said belt.

5. A magnetic head positioning mechanism according to claim 2, wherein said pulling means contains a spring which is fixed at one end and coupled at the other end with said carriage, and pulls said carriage in a direction of the extension of said guide rail means.

* * * * *